United States Patent
Kim et al.

(10) Patent No.: US 9,217,393 B2
(45) Date of Patent: Dec. 22, 2015

(54) INDEPENDENT FUEL INJECTION SYSTEM OF CNG ENGINE

(75) Inventors: Jonghyuck Kim, Suwon-si (KR); Sungha Lee, Seoul (KR); Jonggyun Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 629 days.

(21) Appl. No.: 13/495,522

(22) Filed: Jun. 13, 2012

(65) Prior Publication Data

US 2013/0146029 A1  Jun. 13, 2013

(30) Foreign Application Priority Data

Dec. 9, 2011  (KR) .......................... 10-2011-0131683

(51) Int. Cl.
*F02M 61/14* (2006.01)
*F02M 21/02* (2006.01)
*F02F 1/24* (2006.01)

(52) U.S. Cl.
CPC .............. *F02M 21/0215* (2013.01); *F02F 1/24* (2013.01); *F02M 21/0278* (2013.01); *F02M 21/0281* (2013.01); *Y02T 10/32* (2013.01)

(58) Field of Classification Search
CPC ..... F02M 61/14; F02M 61/145; F02M 69/04; F02M 21/0278; F02M 61/168; F02M 61/18
USPC ................. 123/445, 468, 469, 470; 239/533.2
See application file for complete search history.

(56) References Cited

U.S. PATENT DOCUMENTS

| | | | | |
|---|---|---|---|---|
| 3,330,541 | A * | 7/1967 | Jackson | 261/23.2 |
| 4,640,234 | A * | 2/1987 | Olsson et al. | 123/557 |
| 4,969,446 | A * | 11/1990 | Olsson et al. | 123/585 |
| 5,450,829 | A * | 9/1995 | Beck | 123/435 |
| 5,738,076 | A * | 4/1998 | Kim | 123/527 |
| 6,609,499 | B2 * | 8/2003 | Kabat et al. | 123/432 |
| 8,267,068 | B1 * | 9/2012 | Low | 123/468 |
| 8,800,530 | B2 * | 8/2014 | Vijayaraghavan et al. | 123/308 |
| 2004/0149255 | A1 * | 8/2004 | zur Loye et al. | 123/295 |
| 2010/0242917 | A1 * | 9/2010 | Ohta et al. | 123/470 |
| 2011/0094478 | A1 * | 4/2011 | Scheffel et al. | 123/470 |
| 2012/0037727 | A1 * | 2/2012 | Reiter | 239/533.2 |
| 2013/0042836 | A1 * | 2/2013 | Trembath et al. | 123/470 |

FOREIGN PATENT DOCUMENTS

| | | |
|---|---|---|
| JP | 2002-227726 A | 8/2002 |
| JP | 2008-163824 A | 7/2008 |
| KR | 10-0559167 B1 | 3/2006 |
| KR | 10-2009-0111402 A | 10/2009 |

* cited by examiner

*Primary Examiner* — Mahmoud Gimie
*Assistant Examiner* — Sizo Vilakazi
(74) *Attorney, Agent, or Firm* — Morgan, Lewis & Bockius LLP

(57) ABSTRACT

An independent fuel injection system of a compressed natural gas (CNG) engine, may include a cylinder head having an intake port of an engine using CNG as fuel; an intake manifold communicating with the cylinder head so as to supply external air to the cylinder head; and an injection module installed at a predetermined portion of the intake manifold adjacent to the cylinder head and injecting the CNG fuel toward the intake port.

6 Claims, 2 Drawing Sheets

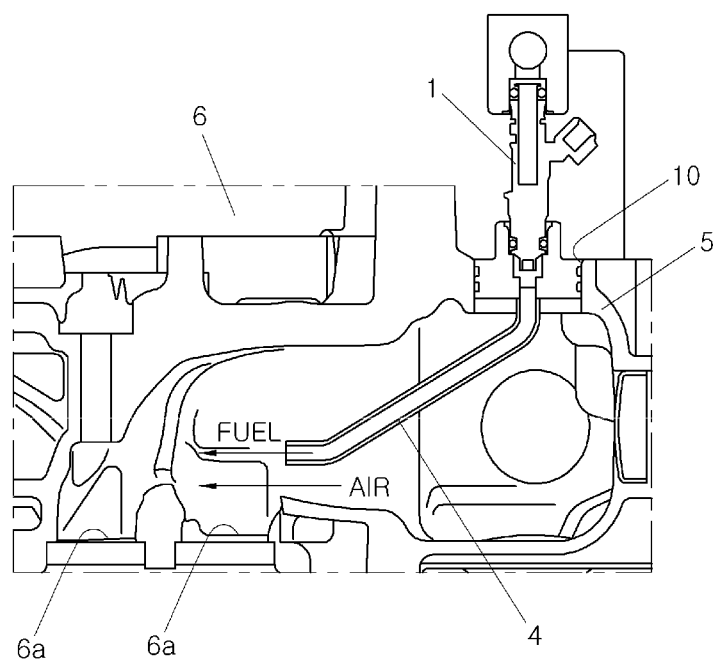

INDEPENDENT FUEL INJECTION SYSTEM OF CNG ENGINE

CROSS-REFERENCE TO RELATED APPLICATIONS

The present application claims priority to Korean Patent Application Number 10-2011-0131683 filed Dec. 9, 2011, the entire contents of which application is incorporated herein for all purposes by this reference.

BACKGROUND OF THE INVENTION

1. Field of the Invention

The present invention relates to an engine using compressed natural gas (CNG) as fuel, and more particularly, to an independent fuel injection system of a CNG engine, which includes an injector installed in an intake manifold and injecting fuel to each cylinder.

2. Description of Related Art

In general, CNG fuel exhibits higher combustion efficiency and generates a smaller amount of air contaminant than other vehicle fuels such as gasoline and diesel.

A vehicle engine system according to the related art, using the above-described CNG as fuel, generally includes a turbocharger, an intercooler, an injector, a mixer, and a throttle body. The turbocharger compresses intake air from outside to improve volume efficiency. The intercooler cools down boosted intake air which is discharged from the turbocharger. The injector injects CNG fuel. The mixer mixes the CNG injected from the injector with the intake air discharged from the intercooler. The throttle body supplies the mixture gas, containing the air and fuel mixed by the mixer, to the engine.

The mixture gas introduced through the throttle body is supplied to each cylinder of the engine and ignited by an ignition coil installed in the cylinder. The ignition operation of the ignition coil is controlled by an ignition control device. The ignition control device is connected to an engine control unit (ECU) so as to receive a control signal from the ECU, and a boost control valve is provided to control a boost of the intake air introduced to the turbocharger.

In the above-described CNG engine according to the related art, a cylinder head and an intake manifold have no partition wall for partitioning the introduction of mixture gas to each cylinder formed in a cylinder block, but the entire mixture gas is introduced into one entrance of the cylinder head.

Accordingly, multi-point injection may not be applied, and fuel injection to each cylinder and control for the fuel injection cannot be performed because there is no partition wall. Further, the mixture gas introduced into one entrance may be introduced into another cylinder.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an independent fuel injection system of a CNG engine, which is capable of independently injecting fuel to each cylinder formed in a cylinder block and controlling the injection of fuel according to the operation state of each cylinder, thereby improving the power and fuel efficiency of the engine.

In an aspect of the present invention, an independent fuel injection system of a compressed natural gas (CNG) engine, may include a cylinder head having an intake port of an engine using CNG as fuel, an intake manifold communicating with the cylinder head so as to supply external air to the cylinder head, and an injection module installed at a predetermined portion of the intake manifold adjacent to the cylinder head and injecting the CNG fuel toward the intake port.

The intake manifold may have an assembling hole formed at the predetermined portion thereof, and the injection module is partially inserted and assembled into the assembling hole.

The injection module may include an injector injecting the fuel, a mounting body having an upper portion coupled to the injector and selectively inserted and assembled into the assembling hole, and an injection nozzle having one end communicating with the injector and the other end inserted into the intake manifold and extended toward the intake port.

The mounting body may include a lower portion coupled to the upper portion and having a larger diameter than the upper portion, the lower portion being selectively inserted and assembled into the assembling hole.

The lower portion may include a cylindrical body, upper and lower jaws protruded in a radial direction at upper and lower ends of the cylindrical body, respectively, and has an extended diameter, and an O-ring disposed on the cylindrical body between the upper jaw and the lower jaw and is selectively assembled onto an inner surface of the assembling hole so as to maintain airtightness of the assembling hole.

The other end of the injection nozzle is bent so as to be inclined from upward to downward, and extended toward the intake port.

The other end of the injection nozzle further extends in a horizontal direction.

The injector is aligned in a vertical direction.

The intake manifold may have a structure which may have no partition wall for each cylinder forming a combustion chamber.

The intake manifold is formed integrally with the cylinder head.

According to the independent fuel injection system of a CNG engine, as the injector for injecting fuel to each cylinder is installed at the predetermined portion of the intake manifold adjacent to the connection portion between the cylinder head and the intake manifold, the mounting of the injection module and the design thereof may be easily performed without design change of the cylinder head. Since fuel may be independently injected to each cylinder and the fuel injection may be controlled according to the operation state of the cylinder, the power and fuel efficiency of the engine may be improved. Since the distance between the cylinder of the engine and the fuel injection position of the injector is reduced, the real-time response speed increases after the fuel injection from the injector. Therefore, the fuel efficiency may be additionally improved. Further, the mounting and detaching of the injection module may be easily performed, and the injector nozzle may be designed in various manners by considering the type of the engine and the shape of the cylinder head. Accordingly, the layout is improved.

The methods and apparatuses of the present invention have other features and advantages which will be apparent from or are set forth in more detail in the accompanying drawings, which are incorporated herein, and the following Detailed

BRIEF DESCRIPTION OF THE DRAWINGS

FIG. 2 is a cross-sectional view of the injector according to the exemplary embodiment of the present invention, illustrating a state in which the injector is mounted in an intake manifold.

Figure 1:
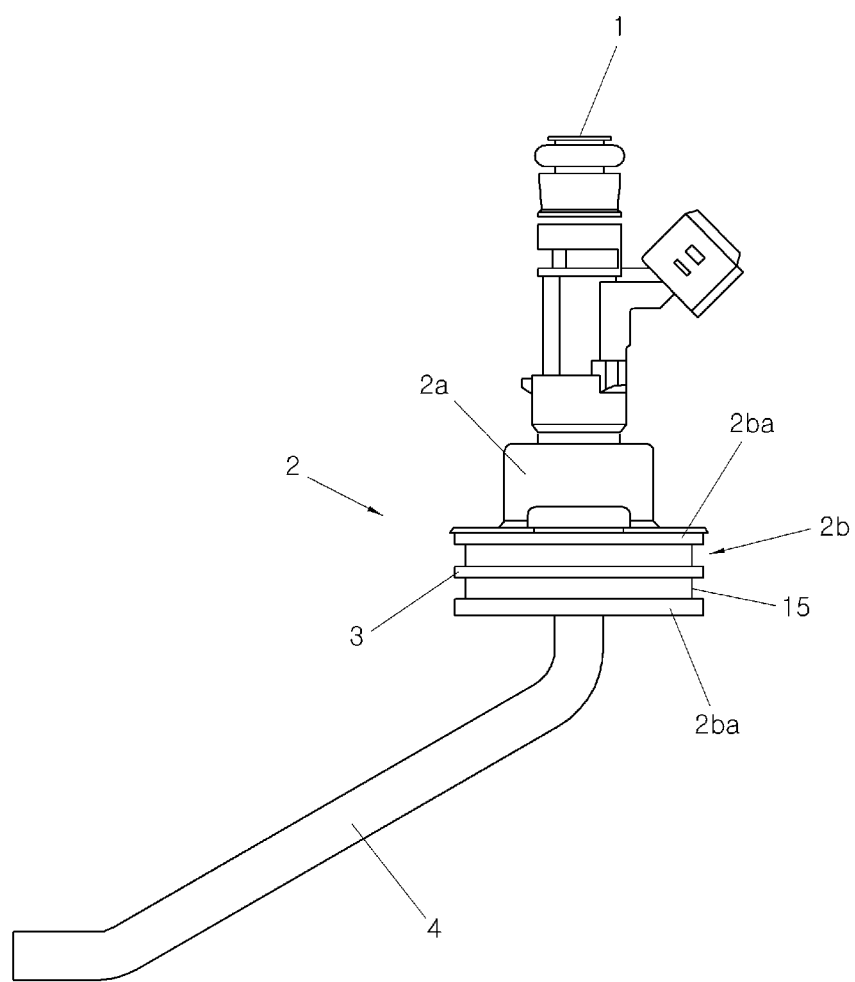
FIG. 1 is a front view of an injector according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an injection module according to an exemplary embodiment of the present invention includes an injector 1 disposed in the upper portion thereof and injecting fuel. Injector 1 has a shape erected in a vertical direction from the upper portion to the lower portion thereof.

A mounting body 2 is assembled into the lower portion of injector 1, in order to mount injector 1 in an intake manifold.

The intake manifold has no partition wall for each cylinder of a combustion chamber, and is integrally formed in a cylinder head.

Mounting body 2 has a double body structure of which an upper portion 2a has a small diameter and a lower portion 2b has a large diameter. Lower portion 2b of the mounting body includes jaws 2ba extended from the cylindrical body 15 in the radial direction.

Jaws 2ba are formed at the upper and lower ends of the cylindrical body 15 so as to protrude from the cylindrical body 15.

An O-ring 3 is assembled to the cylinder body between the upper and lower jaws, and maintains airtightness when the cylindrical body 15 is assembled into the intake manifold.

An injection nozzle 4 is extended downward from the lower end of mounting body 2. Injection nozzle 4 has a pipe shape. Although not illustrated, one end of injection nozzle 4 is connected to injector 1, and the other end of injection nozzle 4 is bent so as to be inclined downward, and extended in a horizontal direction so as to be inserted into a cylinder head.

Referring to FIG. 2, the injection module having the above-described structure is mounted on the outer surface of intake manifold 5.

That is, the injection module is installed so as to be positioned at a predetermined portion of intake manifold 5 adjacent to cylinder head 6.

The injection module is installed at the predetermined portion of intake manifold 5 in a state where it is erected from upward to downward. The intake manifold 5 has an assembling hole 10 for installing the injection module.

When the injection module is installed in the intake manifold, upper portion 2a of mounting body 2 is disposed over the outer surface of the intake manifold, and lower portion 2b of mounting body 2 is inserted and assembled into the assembling hole 10 of the intake manifold. O-ring 3 maintains airtightness of the assembling hole 10 in a state where lower portion 2b of mounting body 2 is inserted into the assembling hole 10 of the intake manifold, and the upper and lower jaws also serve to maintain airtightness.

Injection nozzle 4 is completely inserted into intake manifold 5, and the other end thereof is disposed adjacent to an intake port 6a formed in cylinder head 6 such that fuel injected from a leading end of injection nozzle 4 is directly supplied toward the intake port.

In this case, external air is introduced from intake manifold 4 and supplied toward intake port 6a with the fuel injected from injection nozzle 4.

As the injection module for supplying fuel to each cylinder is installed at the predetermined portion of the intake manifold adjacent to the intake port of the cylinder, the fuel may be injected while the duty of the injector is controlled according to the operation situation of the cylinder. Therefore, the power and fuel efficiency of the engine may be improved. Further, as the position of the injection nozzle is disposed adjacent to the intake port, the real-time response speed of the fuel injected from the injection nozzle increases, thereby improving fuel efficiency.

As the injection module is installed at the predetermined portion of the intake manifold, the injection module may be easily mounted and detached without design change of the cylinder head. Further, the design of the injection module may be easily changed according to the type of the engine and the shape of the cylinder head. For example, the inclination of the nozzle and the design of the outer or inner diameter of the nozzle may be changed in various manners. Therefore, the layout is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An independent fuel injection system of a compressed natural gas (CNG) engine, comprising:

a cylinder head having an intake port of an engine using CNG as fuel;

an intake manifold communicating with the cylinder head so as to supply external air to the cylinder head, having an assembling hole formed at a predetermined portion thereof; and an injection module installed at the predetermined portion of the intake manifold adjacent to the cylinder head and injecting the CNG fuel toward the intake port, wherein the injection module includes:
   an injector injecting the fuel;
   an injection nozzle having one end communicating with the injector and the other end inserted into the intake manifold and extended toward the intake port; and
   a mounting body having an upper portion coupled to the injector and a lower portion coupled to the upper portion, wherein the lower portion has a larger diameter than the upper portion, and is inserted and assembled into the assembling hole, wherein the lower portion includes:
   a cylindrical body;
   upper and lower jaws protruded in a radial direction at upper and lower ends of the cylindrical body, respectively, and having an extended diameter; and
   an O-ring disposed on the cylindrical body between the upper jaw and the lower jaw, wherein the upper and lower jaws and the O-ring are assembled onto an inner surface of the assembling hole to maintain airtightness of the assembling hole which is a non-tapered assembling hole.

2. The independent fuel injection system as defined in claim 1, wherein the other end of the injection nozzle is bent so as to be inclined from upward to downward, and extended toward the intake port.

3. The independent fuel injection system as defined in claim 2, wherein the other end of the injection nozzle further extends in a horizontal direction.

4. The independent fuel injection system as defined in claim 1, wherein the injector is aligned in a vertical direction.

5. The independent fuel injection system as defined in claim 1, wherein the intake manifold has no partition wall for partitioning mixture gas being introduced to each cylinder formed in a cylinder block.

6. The independent fuel injection system as defined in claim 1, wherein the intake manifold is formed integrally with the cylinder head.

\* \* \* \* \*